June 24, 1958
J. P. CARR
2,840,300
SPRAYING APPARATUS
Filed Jan. 9, 1956
3 Sheets-Sheet 1
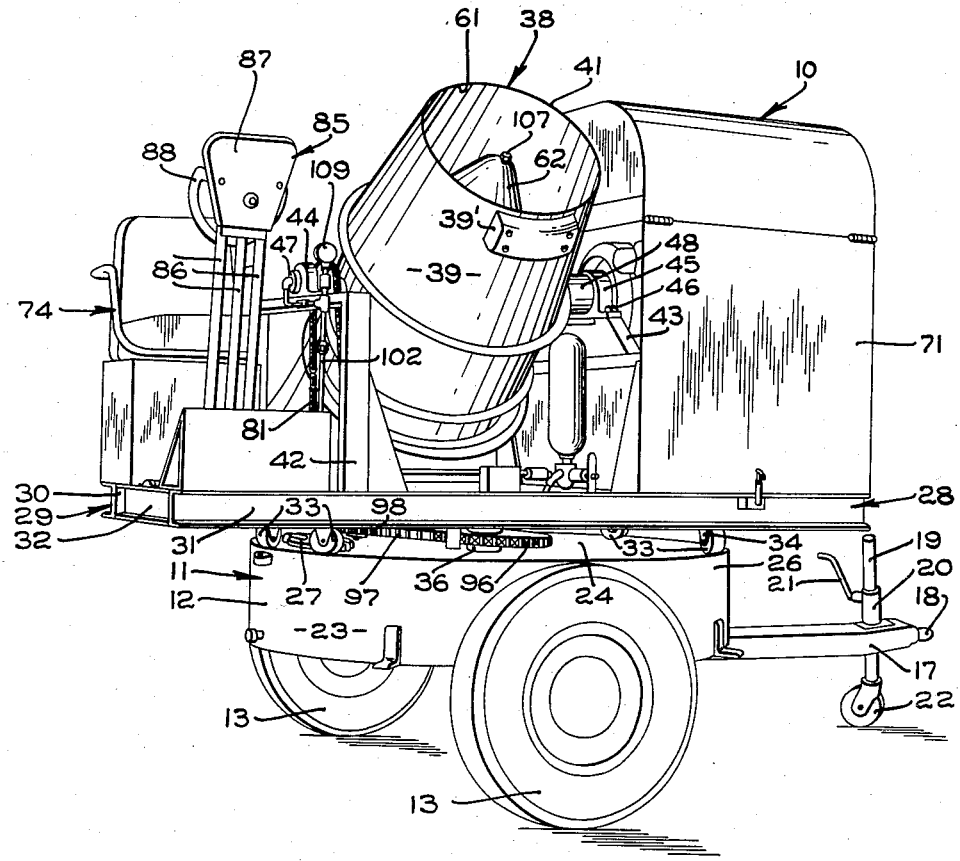
FIG_1
INVENTOR
JAMES P. CARR
BY Hans G. Hoffmeister
ATTORNEY June 24, 1958     J. P. CARR     2,840,300
SPRAYING APPARATUS
Filed Jan. 9, 1956     3 Sheets-Sheet 2
FIG_2
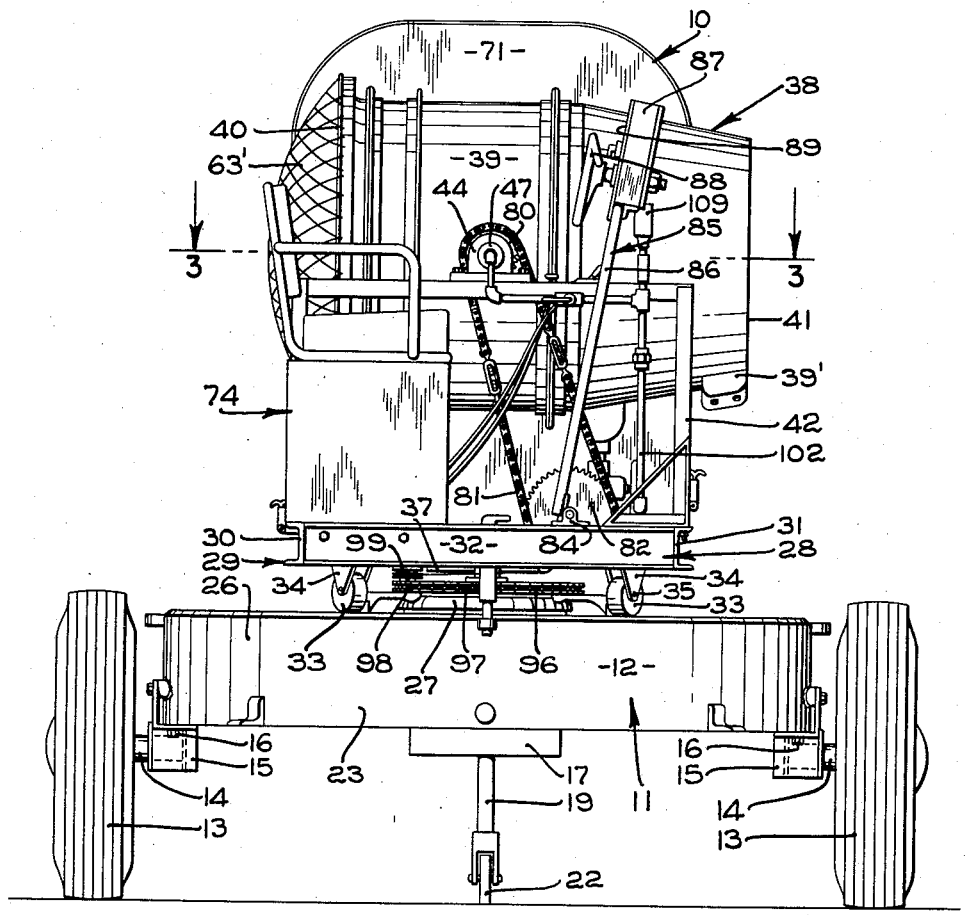
INVENTOR
JAMES P. CARR
BY *Hans G. Hoffmeister*
ATTORNEY

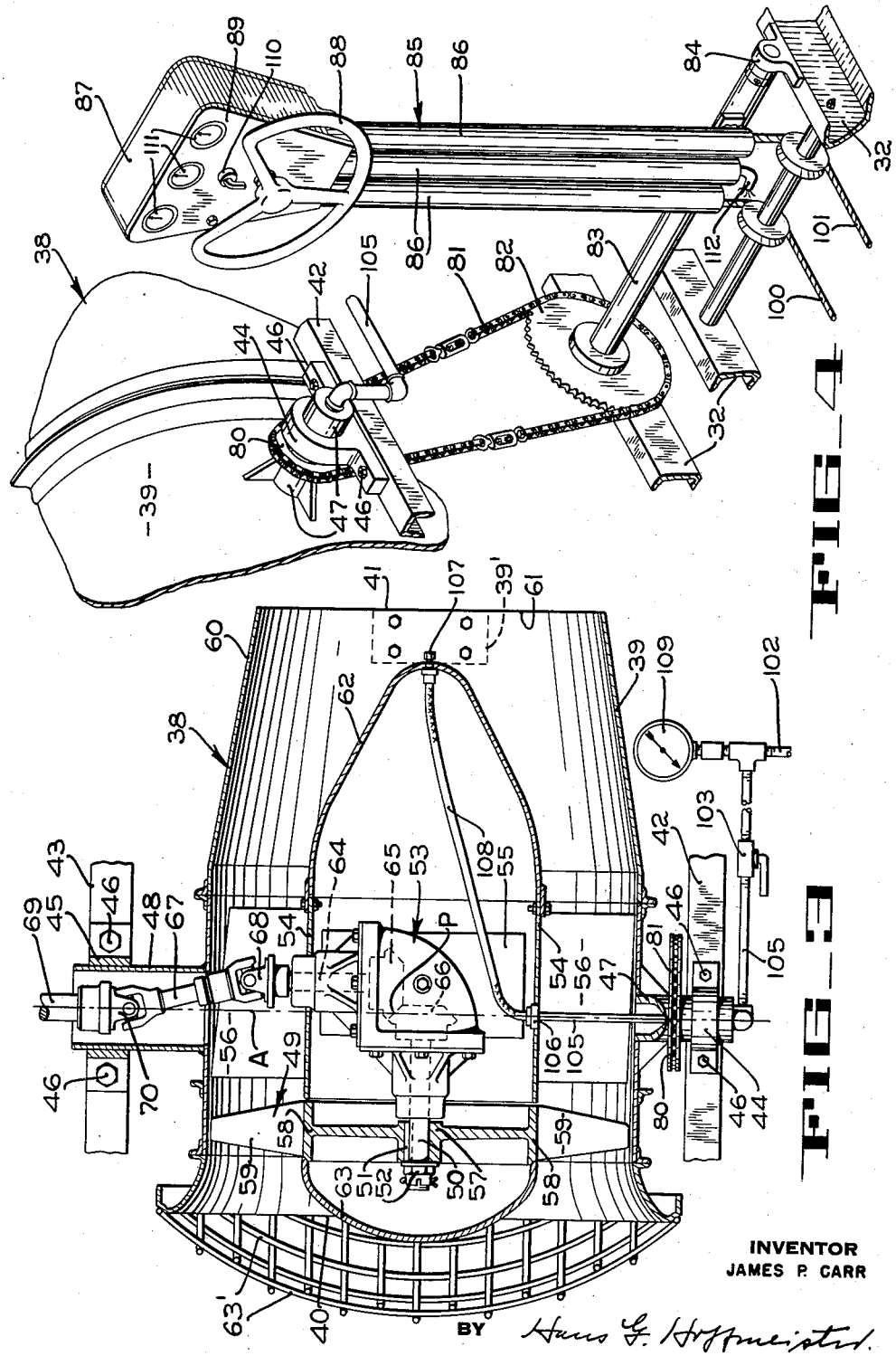

United States Patent Office 2,840,300
Patented June 24, 1958

2,840,300

SPRAYING APPARATUS

James P. Carr, Lansing, Mich., assignor to Food Machinery and Chemical Corporation, San Jose, Calif., a corporation of Delaware Application January 9, 1956, Serial No. 558,103

6 Claims. (Cl. 230—235)

This invention relates to spraying apparatus, and more particularly to power driven machines for generating and controlling a blast of air for conveying spray material to relatively distant objects.

An object of the present invention is to provide an improved blower drive assembly for a power driven spraying apparatus.

Another object of the present invention is to provide a spraying apparatus including a pivotally mounted blower and having improved directional control over the air stream generated by the blower for reducing or eliminating torque force reactions on the blower housing.

Other objects and advantages of the invention will become apparent from the following description and the accompanying drawings, in which:

Fig. 1 is a perspective of a spraying apparatus incorporating therein the drive assembly of the invention.

Fig. 2 is a rear elevational view of the spraying apparatus of Fig. 1.

Fig. 3 is a section taken along line 3—3 of Fig. 2 through the blower and the drive assembly therefor.

Fig. 4 is a fragmentary perspective of the directional control mechanism for the blower of Figs. 1-3.

The spraying apparatus 10 of the present invention is mounted on a suitable chassis 11 (Figs. 1 and 2) comprising a body portion 12 supported on wheels 13. For rotatably mounting the wheels 13, axially aligned stub shafts or axles 14 are provided. Each stub shaft 14 is secured at its inner end to a rectangular frame 15, which in turn is fastened to the lower side of the body portion 12 by suitable means, such as bolts 16.

For attaching the spraying apparatus to a suitable towing machine, a towing tongue 17 rigid with the body portion 12 extends forward from the front end thereof and is provided with a suitable coupling device 18. A vertical rod 19 extends slidably through a tubular guide 20 adjacent to the front end of the tongue 17 and is adapted to be raised to a retracted position or to be lowered to a tongue-supporting position by a rack and pinion (not shown). The rack and pinion are operated by a hand crank 21. A caster wheel 22 at the lower end of the tongue-supporting rod 19 facilitates moving the spraying machine 10 by hand, when it is disconnected from the towing vehicle.

The body portion 12 of the chassis 11 is in the form of a tank 23 which comprises a circular top wall 24 and a circular bottom wall (not shown) interconnected by a cylindrical peripheral wall 26. The tank 23, which is supported by the two rectangular frames 15, is of liquid-tight construction. The top wall 24 is provided with a filler opening having a removable cover 27, which permits filling the tank with a suitable spraying substance, for example, a liquid pesticide.

In order to support a turntable 28 on the tank 23, the top wall 24 is suitably constructed to provide a flat surface support. The turntable 28 comprises a frame 29, which includes two side channel members 30 and 31. The side members 30 and 31 are retained in spaced parallel relation by a plurality of transverse channel members 32. For rotatably supporting the turntable 28 on the top wall 24, a plurality of rollers 33 are provided. Each roller 33 is rotatable within a bracket 34 extending downward from the lower surface of the turntable frame 29 and engages the top wall 24 of the tank 23. The several rollers 33 are arranged at suitable angular intervals about the central vertical axis of the tank 23. For rotatably supporting the rollers 33, pivot pins 35 are provided, which are individually mounted in their respective brackets 34.

Also contributing to the support of the turntable 28 and its load is a sleeve 36, which is secured to the top wall 24 with its axis extending vertically through the center thereof. A flange 37 on the upper end of the sleeve 36 frictionally engages the underside of the frame 29 of the turntable 28 and thus supports a portion of the weight thereof.

For generating and directing an air stream of high velocity, to be used in the application of spray material, a blower assembly 38 is provided. The blower assembly comprises a housing or casing 39, which is of tubular form and is open at both its inlet end 40 and its outlet end 41.

To support the housing 39, two upstanding frame members 42 and 43 are provided. The frame members 42 and 43 are rigidly mounted on suitably positioned ones of the transverse frame members 32. In order to mount the housing 39, axially aligned trunnion bearings 44 and 45 are fixedly secured to the frame members 42 and 43, respectively, by suitable means, such as bolts 46. Tubular trunnions 47 and 48 rigid with the housing 39 and journaled within the bearings 44 and 45 mount the blower housing 39 for rotary movement about the horizontal axis common to both bearings 44 and 45. This axis of pivotal movement of the blower housing is indicated at A in Fig. 3 and preferably passes through the center of gravity of the blower assembly 38 so that the latter is supported in neutral equilibrium about the axis of the pivotal support. To establish this balanced arrangement, a suitable counterweight 39' may be employed. The counterweight 39' is secured to the underside of the blower housing 39 in a conventional manner.

For generating a blast of air, a propeller 49 is mounted within the casing 39 adjacent to the inlet end 40 for rotation about an axis coinciding with the axis of the casing 39. The propeller 49 is secured to a shaft 50 in a suitable manner such as by a key 51 and a nut 52. The shaft 50 is rotatably supported by and extends rearwardly from a gear housing 53 which is supported within an inner casing or shell 54 by means of a suitable bracket 55. The bracket 55, which extends transversely of the shell 54, supports the gear housing 53 below the axis of the shell 54 so that the axis of the shaft 50 is coincident with the axis of the shell 54. To support the shell 54 in coaxial alignment with the outer casing 39, a plurality of substantially radially disposed fins or vanes 56 are provided which extend between the casings 39 and 54.

The propeller 49 comprises a hub portion 57 having a circumferential rim 58 which constitutes a substantial continuation of the shell 54, and a plurality of impeller blades 59 extending radially from the rim 58. The impeller blades 59 are so pitched that upon rotation of the shaft 50 they generate a blast of air of annular cross section and encompassing the shell 54. The blast of air has a tendency to follow a spiral path through the casing 39 because of the rotary motion of the impeller blades 59, but this tendency is largely overcome by the shell-supporting vanes 56 which are slightly pitched in the direction opposing such spiral motion of the air blast. Therefore, as the blast of air approaches the forward portion 60 of the casing 39, it is characterized by a minimum of turbulence and by a direction of flow substantially parallel to the axis of the casing 39.

The forward portion 60 of the casing 39 is of a tapering form and defines a relatively restricted discharge orifice 61. The forward end 62 of the shell 54 likewise is of tapering form so that it cooperates with the tapering end portion 60 of the casing 39 to restrict the blast of air as it approaches the discharge orifice 61. Accordingly, the effect is not only to increase the velocity of the air blast, but also to change it from an annular cross sectional pattern to a solid jet of air of substantially uniform density and velocity throughout its entire cross section. This arrangement affords improved penetration into surrounding relatively still air and enables the blast of air to carry to a relatively great distance.

A dome-shaped spinner 63 of sheet metal encloses the hub 57 of the propeller 49 and contributes to the streamlined efficiency of the entire blower assembly 38 in producing a smoothly flowing high velocity air stream of large volume. A safety screen 63' covers the inlet end 40 of the blower assembly 38.

For rotating the propeller 49, the propeller drive shaft 50 is driven by a gear drive shaft 64 which extends radially from the gear housing 53. The gear drive shaft 64 is operatively connected to the propeller shaft 50 by a right angle drive mechanism, such as intermeshing right angle bevel gears 65 and 66, which are enclosed within the gear housing 53. The driven gear 66 is secured to the propeller drive shaft 50, while the drive gear 65 is secured to the gear drive shaft 64. The gear drive shaft 64 is rotatably journaled in the gear housing 53 and coupled to an angularly disposed interconnecting shaft 67 by a universal joint 68. For driving the gear drive shaft 64, a power input shaft 69 is provided which is coupled to the interconnecting shaft by a universal joint 70. The input shaft 69 is operably connected to a suitable internal combustion engine (not shown) mounted on the turntable 28 and enclosed within a suitable housing 71. The input shaft 69 is positioned coaxially within the tubular trunnion 48, thus enabling the blower assembly 38 to partake of rotary motion about the axis of its pivotal mounting without disturbing its coaxial relationship to the input shaft 69.

The gear housing 53 is so disposed within the inner casing 54 that the axis of the gear drive shaft 64 is parallel to and offset from the pivot axis A about which the blower assembly 38 is movable. The extent of such offsetting is such that the mean point of load application (indicated at P in Fig. 3) of the bevel gears 65 and 66, lies within the axis A. Accordingly, transmission of power from the shaft 64 to the propeller shaft 50 occurs at a mean point P where no torque is imparted to the blower assembly 38, since the torque component or lever arm relative to the axis A is of zero value at the point P.

Thus, it may be seen that tendency for the blower assembly 38 to be turned about the axis of its pivotal mounting as the result of the application of power to its propeller 49 by a power shaft coaxial with the pivotal mounting, is reduced substantially to zero.

Means under direct control of an operator seated at the operator's station 74 are provided for imparting rotary movement to the blower assembly 38 about the horizontal axis of the tubular trunnions 47 and 48 to control the elevation of the air stream emitted therefrom. For imparting rotary movement to the blower assembly 38, a sprocket 80 secured to the trunnion 47 is operably connected by a chain 81 to another sprocket 82. The sprocket 82 is secured to a shaft 83 that is journaled in a bearing 84, which is secured to the frame 29 of the turntable 28 in front of the operator's position 74. A control column 85 comprising three parallel tubes 86 is rigidly secured at its lower end to the shaft 83 and extends upward therefrom to mount a cabinet 87 on its upper end substantially at eye level in front of an operator seated at the station 74. The parts are so arranged and proportioned that the operator can comfortably grasp a wheel 88 mounted on a front panel 89 of the cabinet 87 so as to use the wheel 88 to move the control column 85 toward or away from himself, thus imparting rotary motion to the blower assembly 38 about its horizontal axis through the sprockets 80 and 82 and the chain 81.

Mounting the right angle bevel gears 65 and 66 so that the mean point of load application thereof lies within the horizontal axis of pivotal movement of the blower housing 39 avoids disturbing the balanced condition or state of neutral equilibrium of the blower assembly 38. Thus, movement of the blower assembly in either direction about the horizontal axis A is controlled easily by the operator, since he does not have to overcome any torque forces imparted to the blower assembly by the input shaft 69.

An operator seated at the station 74 also has under his immediate control means for varying the horizontal direction of the blast of air issuing from the blower assembly 38. The means for accomplishing this includes a sprocket wheel 96 (Figs. 1 and 2) secured to the sleeve 36 below the turntable 28, and a chain 97 trained around the sprocket wheel 96. The chain 97 is also trained around a smaller sprocket 98 rigid with a shaft 99 journaled on the turntable frame 29. A turntable drive mechanism suitable for rotating the shaft is fully disclosed in U. S. Patent No. 2,768,859, entitled "Spraying Apparatus," issued on October 30, 1956, to Joseph M. Patterson, but since its details have no bearing upon the present invention, they need not be illustrated or described herein. It may be pointed out, however, that the turntable drive mechanism is at all times under the full control of the operator. The wheel 88 (Fig. 4) is rotatably mounted on the front panel 89 of the control column 85 and is connected by cables 100 and 101 to opposite ends of a control lever of the control mechanism, which cables are trained around a series of sheaves. By turning the wheel 88 clockwise as viewed in Fig. 4, pull is exerted on the cable 100, which operates the control lever of the turntable drive mechanism to effect clockwise rotation of the turntable 28 as viewed from above, as fully explained in the above mentioned patent. Counterclockwise movement of the wheel 88 operates the control lever to effect rotation of the turntable in the opposite direction, and when the wheel is placed in the intermediate position illustrated, the turntable drive mechanism is inactivated and the turntable is immobilized.

In order to inject liquid pesticide into the air blast issuing from the blower assembly 38, suitable tubing 102, extending from within the tank 23, is connected to a control valve 103 conveniently accessible to an operator seated at the operator's station 74 (Figs. 1 and 2). From the valve 103, tubing 105 passes through the tubular trunnion 47 (Fig. 3) to the interior of the blower casing 39 where it is connected to a suitable coupling 106. In order to connect the coupling 106 to a spray nozzle 107, flexible tubing 108 is provided. The spray nozzle 107 is mounted at the apex of the tapering discharge end 62 of the shell 54 and is arranged to discharge finely diffused liquid spray material into the air stream issuing from the discharge orifice 61. A pressure gauge 109 is mounted in front of the operator's station 74 and is connected to the tubing 102 to enable the operator to be informed of the operating pressure within the tubing system.

Means are provided for withdrawing liquid pesticide from the tank 23 and supplying it under suitable pressure to the tubing 102, but since the details of this fluid supply mechanism do not constitute any portion of the present invention, they need not be illustrated or described herein. A fluid supply mechanism suitable for use with the spraying machine hereinabove described is fully disclosed in the aforementioned patent.

An ignition switch 110 and appropriate indicating instruments 111 for the engine are mounted on the front panel 89 of the cabinet 87, and are connected to the associated portions of, or accessories to, the motor by insulating wiring 112 extending through the intermediate tube 86 of the control column 85.

While a preferred embodiment of the present invention has been shown and described, it will be understood the various changes and modifications may be made without departing from the spirit of the invention or scope of the appended claims.

What I claim and desire to protect by Letters Patent is:

1. In a blower assembly, a blower housing, a propeller rotatably mounted in said housing, axially aligned trunnions extending laterally from said housing, means pivotally supporting the trunnions to mount the housing for rotary movement about a transverse axis, a drive shaft extending coaxially with one of said trunnions, a right angle gear drive mechanism mounted within the housing with its mean point of load application within said transverse axis and connected at one end to said drive shaft, and means connecting the other end of said drive mechanism to said propeller.

2. In a blower assembly, a tubular blower housing, a propeller rotatably mounted in said housing, axially aligned trunnions extending laterally from said housing, bearing means pivotally supporting the trunnions for rotary movement about a transverse axis, drive means extending through one of said trunnions to transmit power from without the housing to the interior thereof, said drive means including a drive shaft journalled without the housing in coaxial alignment with the trunnions, a right angle gear drive mechanism within the housing and having its mean point of load application within the axis of rotary movement of the housing, an angularly disposed shaft interconnecting said drive shaft and one end of said drive mechanism to operate the drive mechanism, and means connecting the propeller to the other end of the drive mechanism to drive said propeller.

3. In a blower assembly, a tubular blower housing, a propeller shaft rotatably mounted within said housing and extending longitudinally thereof, a propeller carried by the shaft, axially aligned trunnions extending laterally from said housing with their common axis extending transversely thereof, a driven bevel gear connected to said propeller shaft for imparting rotation thereto, a driving bevel gear intermeshing with said driven gear, means in said housing mounting said gears with the mean point of contact engagement therebetween within said transverse axis, a gear shaft connected to said driving gear, an angularly disposed shaft operably connected to said gear shaft, and a drive shaft extending into one of said trunnions and operably connected to said angularly disposed shaft to transmit power from without the housing to the angularly disposed shaft.

4. In a blower assembly, a tubular blower housing, a tubular shell in said housing positioned coaxially therewith, a propeller shaft journaled coaxially within said shell, a propeller carried by the shaft, axially aligned trunnions extending laterally from said housing with their common axis extending transversely of the housing through the center of gravity of the blower assembly, a drive shaft extending into one of said trunnions coaxially therewith, a driven gear connected to said propeller shaft for imparting rotation thereto, a driving gear intermeshing with said driven gear in angular relation therewith, means in said shell mounting said gears with the mean point of contact engagement therebetween within said transverse axis, a gear shaft connected to said drive gear, and an angularly disposed shaft having universal joints at the extremities thereof for interconnecting said gear shaft and said drive shaft.

5. In a spraying apparatus, a housing, axially aligned trunnions extending laterally from said housing, journal means for said trunnions supporting said housing for rotary movement about a transverse axis, a drive shaft extending laterally of said housing, a drive member, means connecting said drive member to said drive shaft and positioned at an angle to said drive shaft, a driven member disposed at right angle to said drive member and having contact with said drive member at a point within said axis of rotary movement of said housing, a propeller rotatably mounted in said housing, and means connecting said propeller to said driven member.

6. In a spraying apparatus, a housing, axially aligned trunnions extending laterally from said housing, journal means for said trunnions supporting said housing for rotary movement about a transverse axis, a drive shaft extending into one of said trunnions coaxially therewith, a drive member, means connecting said drive member to said drive shaft to dispose the drive member in offset relation to the drive shaft, a driven member disposed at right angle to said drive member and having contact with said drive member at a point within said axis of rotary movement of said housing, a propeller rotatably mounted in said housing, and means connecting said propeller to said driven member.

References Cited in the file of this patent

UNITED STATES PATENTS

| 2,551,789 | Copley | May 8, 1951 |
| 2,583,753 | Spreng | Jan. 29, 1952 |
| 2,587,240 | Spreng | Feb. 26, 1952 |

FOREIGN PATENTS

| 1,052,221 | France | Sept. 23, 1953 |